United States Patent
Nanda et al.

(10) Patent No.: US 10,224,565 B2
(45) Date of Patent: Mar. 5, 2019

(54) HIGH ENERGY DENSITY SECONDARY LITHIUM BATTERIES

(71) Applicant: UT-BATTELLE, LLC, Oak Ridge, TN (US)

(72) Inventors: Jagjit Nanda, Knoxville, TN (US); Nancy J. Dudney, Knoxville, TN (US); Chaitanya Kumar Narula, Knoxville, TN (US); Sreekanth Pannala, Knoxville, TN (US); Raymond Robert Unocic, Knoxville, TN (US); Surendra Kumar Martha, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 799 days.

(21) Appl. No.: 13/651,322

(22) Filed: Oct. 12, 2012

(65) Prior Publication Data

US 2014/0106215 A1 Apr. 17, 2014

(51) Int. Cl.
  *H01M 4/04* (2006.01)
  *H01M 4/505* (2010.01)
  (Continued)

(52) U.S. Cl.
  CPC ..... *H01M 10/0525* (2013.01); *H01M 4/0471* (2013.01); *H01M 4/131* (2013.01);
  (Continued)

(58) Field of Classification Search
  CPC . H01M 10/0525; H01M 4/0471; H01M 4/505
  See application file for complete search history.

(56) References Cited

U.S. PATENT DOCUMENTS 6,309,778 B1 * 10/2001 Skotheim et al. ............ 429/213
7,745,047 B2 6/2010 Zhamu et al.
(Continued)

FOREIGN PATENT DOCUMENTS

CN 102347475 A 2/2012
JP 2007280803 A 10/2007
(Continued)

OTHER PUBLICATIONS

Scrosati et al., "Lithium batteries: Status, prospects and future," Journal of Power Sources 195 (2010) 2419-2430.
(Continued)

*Primary Examiner* — Sarah A. Slifka
*Assistant Examiner* — Haroon S. Sheikh
(74) *Attorney, Agent, or Firm* — Fox Rothschild LLP

(57) ABSTRACT

A lithium ion battery includes a positive electrode comprising carbon fibers, a binder composition with conductive carbon, and a lithium rich composition. The lithium rich composition comprises at least one selected from the group consisting of $Li_{1+x}(My\ Mz^{II}\ Mw^{III})O_2$ where $x+y+z+w=1$, and $xLi_2MnO_3(1-x)LiMO_2$, where $x=0.2-0.7$, and where M, $M^{II}$ and $M^{III}$ are interchangeably manganese, nickel and cobalt, and $LiM_{2-x}M_x^{II}O_4$, where M and $M^{II}$ are manganese and nickel, respectively, with $x=0.5$. A negative electrode comprises carbon fibers having bound thereto silicon nanoparticles, and a mesophase pitch derived carbon binder between the silicon nanoparticles and the carbon fibers. An electrolyte is interposed between the positive electrode and the negative electrode. Methods of making positive and negative electrodes are also disclosed.

13 Claims, 10 Drawing Sheets

(51) Int. Cl.
*H01M 10/05* (2010.01)
*H01M 10/0525* (2010.01)
*H01M 4/525* (2010.01)
*H01M 4/131* (2010.01)
*H01M 4/134* (2010.01)
*H01M 4/1391* (2010.01)
*H01M 4/1395* (2010.01)
*H01M 4/587* (2010.01)
*H01M 4/62* (2006.01)
*H01M 4/02* (2006.01)

(52) U.S. Cl.
CPC ......... *H01M 4/134* (2013.01); *H01M 4/1391* (2013.01); *H01M 4/1395* (2013.01); *H01M 4/505* (2013.01); *H01M 4/525* (2013.01); *H01M 4/587* (2013.01); *H01M 4/625* (2013.01); *H01M 2004/021* (2013.01); *Y02T 10/7011* (2013.01)

(56) References Cited

U.S. PATENT DOCUMENTS

| | | | |
|---|---|---|---|
| 7,993,780 B2 | 8/2011 | Jang et al. | |
| 8,119,288 B2 | 2/2012 | Zhamu et al. | |
| 2003/0013007 A1* | 1/2003 | Kaun | 429/94 |
| 2003/0049530 A1* | 3/2003 | Wang et al. | 429/220 |
| 2005/0084759 A1 | 4/2005 | Miyachi et al. | |
| 2009/0047579 A1 | 2/2009 | Jang et al. | |
| 2009/0169996 A1 | 7/2009 | Zhamu et al. | |
| 2009/0176159 A1 | 7/2009 | Zhamu et al. | |
| 2010/0075229 A1* | 3/2010 | Atsuki | H01M 4/131 429/231.8 |
| 2010/0261058 A1* | 10/2010 | Lopatin et al. | 429/212 |
| 2010/0316907 A1* | 12/2010 | Yamamoto et al. | 429/188 |
| 2011/0111279 A1* | 5/2011 | Smithyman | B29C 41/16 429/122 |
| 2011/0111294 A1* | 5/2011 | Lopez et al. | 429/217 |
| 2011/0123866 A1 | 5/2011 | Pan et al. | |
| 2011/0143018 A1 | 6/2011 | Peng et al. | |
| 2011/0206992 A1* | 8/2011 | Campbell | H01M 4/80 429/235 |
| 2011/0244305 A1* | 10/2011 | Zhang et al. | 429/144 |
| 2012/0028120 A1 | 2/2012 | Huang et al. | |
| 2012/0091391 A1* | 4/2012 | Tsuchida et al. | 252/182.1 |
| 2012/0237826 A1* | 9/2012 | Kim et al. | 429/217 |
| 2012/0264020 A1* | 10/2012 | Burton | B82Y 30/00 429/231.8 |
| 2013/0248757 A1* | 9/2013 | Shim | C01B 25/45 252/182.1 |

FOREIGN PATENT DOCUMENTS

| | | |
|---|---|---|
| JP | 2008103353 A | 5/2008 |
| WO | WO 2007140014 A2 | 6/2007 |

OTHER PUBLICATIONS

Cai et al., "Novel Nanocomposite Materials for Advanced Li-Ion Rechargeable Batteries," Materials 2009, 2, 1205-1238.

* cited by examiner (a)

(b)

(c)

HIGH ENERGY DENSITY SECONDARY LITHIUM BATTERIES

This invention was made with government support under contract No. DE-AC05-00OR22725 awarded by the U.S. Department of Energy. The government has certain rights in this invention.

FIELD OF THE INVENTION

This invention relates generally to lithium ion batteries, and more particularly to electrodes for lithium ion batteries and methods for making electrodes for high energy density lithium ion batteries.

BACKGROUND OF THE INVENTION

A large variety of materials have been synthesized and evaluated as cathode materials for Li-batteries. Notable among them is the layered $LiMO_2$ (M=Co, Ni, Mn) compositions which have already found application in rechargeable lithium ion battery technology. However, only about 50-60% of the theoretical capacity can be utilized in practical cells because of structural and chemical instabilities associated with deep charge of $Li_{1-x}MO_2$ (x>0.5) along with safety issues. In order to increase the energy density, recent developments have focused on the lithium rich Li—Ni—Mn—Co oxide compounds that have significantly higher capacities. See for example Thackeray et al U.S. Pat. No. 7,135,252 and US 2006/0099508, the disclosures of which are incorporated by reference. These materials can be represented using either (i) structurally integrated two-component solid solution notations such as $xLi_2MnO_3(1-x)LiMO_2$ (layered-layered in which the $Li_2MnO_3$ component is electrochemically activated above 4.4 V vs. $Li/Li^+$) or (ii) standard notation as $Li_{1+y}M_{1-y}O_2$ (M=Mn, Ni, Co). For example, the composition $0.6Li[Li_{1/3}Mn_{2/3}]O_2$-$0.4Li[Mn_{0.3}Ni_{0.45}Co_{0.25}]O_2$ (hereafter Li-rich MNC) can be alternately expressed as $Li_{1.2}Mn_{0.525}Ni_{0.175}Co_{0.1}O_2$ in the standard notation for such layered compositions. Electrodes based on these Li-rich MNC compositions can operate at high anodic potentials of 4.9 V vs. $Li/Li^+$ and provide capacities >250 mAh $g^{-1}$. There are still major issues that need to be addressed before these lithium rich compounds can be considered as high-energy cathodes for production Li-ion batteries, especially for electric vehicle applications. Notable among these are poor rate capability, high first cycle irreversibility and significant decrease in the discharge voltage plateau with successive cycling. The large irreversible capacity loss in the range of 50-100 mAh $g^{-1}$ in the first cycle is attributed to the extraction of $Li_2O$ followed by elimination of oxygen ion vacancies from the lattice during first charge, resulting in a lower number of sites for insertion and extraction of $Li^+$ in the subsequent cycles. Further, detailed structural and phase transitions associated with such lithiation-delithiation processes at higher voltage (>4.4 V) are not fully understood yet.

SUMMARY OF THE INVENTION

A lithium ion battery includes a positive electrode comprising carbon fibers, a binder composition comprising conductive carbon, and a lithium rich composition. The lithium rich composition comprises at least one selected from the group consisting of $Li_{1+x}(My\ Mz^{II}\ Mw^{III})O_2$ where x+y+z=1, and $xLi_2MnO_3(1-x)LiMO_2$, where x=0.2-0.7, and where M, $M^{II}$ and $M^{III}$ are interchangeably manganese, nickel and cobalt, and $LiM_{2-x}M_x^{II}O_4$, where M and $M^{II}$ are manganese and nickel, respectively, with x=0.5. A negative electrode comprises carbon fibers having bound thereto silicon nanoparticles, and a mesophase pitch derived carbon binder between the silicon nanoparticles and the carbon fibers. An electrolyte is interposed between the positive electrode and the negative electrode.

The carbon fiber of the positive electrode can be carbon nanofiber, the binder composition can comprises a polymer binder and conductive carbon particles, and the carbon nanofiber, polymer binder and conductive carbon particles can be coated onto a metal current collector.

The carbon fiber of the positive electrode can be a carbon fiber mat. The binder composition can comprise a conductive mesophase pitch derived conductive carbon binder.

The silicon nanoparticles can be between 50-100 nm. The total volumetric energy density of the battery can exceed 600 Wh/L. The total gravimetric energy density of the battery can exceed 400 Wh/Kg. The battery can be cycled to a voltage greater than 4.6 volts.

The carbon binder can be derived from thermal decomposition of mesophase petroleum pitch. The loading of silicon nanoparticles on the fibers can be between 25 and 50% by weight. The thickness of the cathode can be between 75-150 μm. The thickness of the silicon-carbon fiber anode can be >100 microns and the silicon loading can be between 25-50%.

The anode can have an initial capacity that exceeds at least by 10% the capacity of the cathode layer when normalized to thickness and area of the electrode. In one aspect either or both electrodes does not comprise a metal current collector. The electrodes in another aspect do not comprise a polymeric binder.

The lithium rich composition can be $Li_{1.2}Mn_{0.525}Ni_{0.175}Co_{0.1}O_2$. The lithium rich composition can be $LiMn_{1.5}Ni_{0.5}O_4$.

The cathode primary particle sizes can be below 100 nm. The carbon nanofibers can have an outer diameter of between 100 and 200 nm. The carbon fibers for the anode can have a diameter between 2-25 μm. The carbon nanofibers can have a hollow core of from ½ to ⅔ of the total fiber diameter.

A method of making a positive electrode includes the step of providing the following constituents: (i) carbon fibers; (ii) a lithium rich composition; (iii) a binder composition with conductive carbon; (iv) and a solvent. A homogenous slurry of at least the binder composition and the lithium rich composition is created. The slurry can be coated onto the surface of a metal current collector such as aluminum or onto a carbon fiber mat. In one aspect the carbon fibers are carbon nanofibers, and the binder composition comprises a polymeric binder and conductive carbon particles. In another aspect, the carbon fibers are provided as a mat and the binder composition comprises a conductive mesophase pitch derived binder. The slurry is then thermally treated to carbonize the pitch and form a composite electrode. The cathode can comprise carbon fibers, mesophase pitch and the lithium rich composition.

The lithium rich composition can be between 85-90%, the mesophase pitch can be between 5-7%, and the carbon nanofibers can be between 0.5-1% by weight of the electrode.

The solvent can be any suitable solvent, such as N-vinyl pyrolidonne. The thermal treatment can be between 500-700° C.

A method of making a negative electrode includes the step of providing the following constituents: (i) carbon fibers; (ii)

silicon nanoparticles; (iii) a mesophase petroleum pitch; and (iv) a solvent. A homogenous slurry of the constituents (i)-(iv) is created. The slurry is coated onto the surface of a carbon fiber matrix. The slurry is then thermally treated to carbonize the pitch and form a composite electrode.

The carbon fibers can be between 40-50%, the silicon nanoparticles can be between 40-50%, and the mesophase pitch can be between 5-7% relative to the total electrode weight. The solvent can be N-vinyl pyrolidonne. The thermal treatment can be between 500-700° C.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
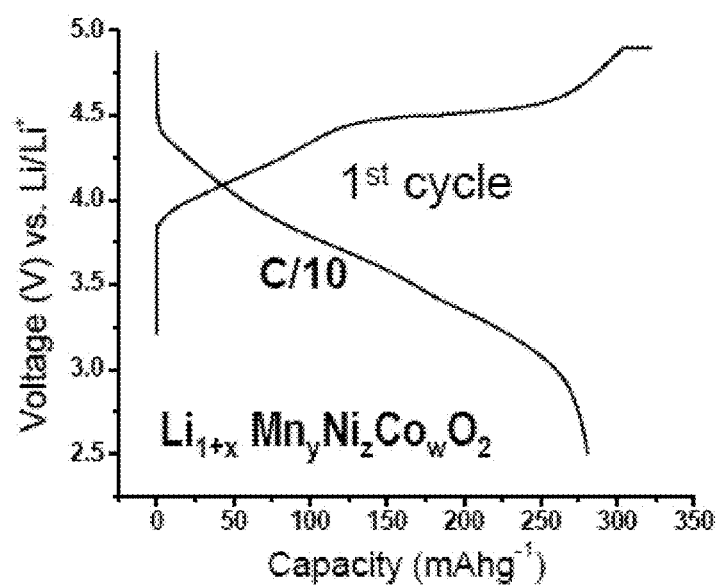
FIG. 1 is a plot of voltage (V) vs. Li/Li$^+$ vs capacity (mAhg$^{-1}$) for a half cell.

A lithium ion battery according to the invention includes a positive electrode comprising carbon fibers, a binder composition comprising conductive carbon, and a lithium rich composition. The lithium rich composition comprises at least one selected from the group consisting of Li y $M_{1+x}(M_y, M_z^{II} M_w^{III})O_2$, where x+y+w+z=1. Alternatively these compositions can be given as $xLi_2MnO_3(1-x)LiMO_2$ where M=Mn,Ni,Co and x=0.2-0.7 and $LiM_{2-x}M_x^{II}O_4$, where M, $M^{II}$ are manganese and nickel, respectively, with x=0.5. A negative electrode comprises carbon fibers having bound thereto silicon nanoparticles. A mesophase pitch derived carbon binder binds the silicon nanoparticles to the carbon fibers, and binds the carbon fibers together. An electrolyte is interposed between the positive electrode and the negative electrode.

The carbon fiber of the positive electrode can be carbon nanofiber, the binder composition can comprises a polymer binder and conductive carbon particles, and the carbon nanofiber, polymer binder and conductive carbon particles can be coated onto a metal current collector. The metal can be any suitable metal, such as aluminum.

The carbon fiber of the positive electrode can be a carbon fiber mat. The binder composition can comprise a conductive mesophase pitch derived conductive carbon binder.

The lithium rich composition in one aspect can be $Li_{1.2}Mn_{0.525}Ni_{0.175}Co_{0.1}O_2$. The other lithium based cathode composition in another aspect is the case of high voltage spinel, $LiMn_{1.5}Ni_{0.5}O_4$. The cathode primary particle sizes can be below 100 nm but can have secondary or aggregated particle sizes ranging up to several microns.

The carbon nanofibers can have an outer diameter of between 100 and 200 nm. The carbon nanofibers can have a hollow core of from ½ to ⅔ of the total fiber diameter.

The carbon fibers for the anode can have a diameter in the range of 5-25 µm, or between 8-10 µm.

The silicon nanoparticles can be between 50-100 nm. The invention is also extendable to other high capacity metal alloy anodes such as Sn and Cu—Sn and Sn—Co nanoparticle compositions. The loading of the silicon nanoparticles on the fibers can be between 30 and 50% of the total electrode mass per unit area and allowing about 50-70% void spaces in the electrode to accommodate the volume changes upon lithiation.

The thickness of the cathode can range anywhere between 75-150 µm. The thickness of the silicon-carbon fiber anode can be >100 µm.

The battery of the invention can have a total volumetric energy density exceeding 600 Wh/L. The total gravimetric energy density of the battery can exceed 400 Wh/Kg. The battery can be cycled to a voltage greater than 4.6 volts.

The carbon binder can be derived from the thermal decomposition of mesophase petroleum pitch. The thermal treatment is selected to carbonize the pitch. In one aspect, the thermal treatment is between 500-700° C.

The battery can be designed such that the anode electrode layer has an initial capacity that exceeds at least by 10% greater than the cathode when normalized to similar thickness and area of the electrode. This is achieved by adjusting the wt % of silicon loading on the C-fiber.

The battery of the invention can be constructed without a metal current collector. Either or both of the electrodes can be constructed without a metal current collector. Also, the battery of the invention can be constructed with electrodes does not comprise a polymeric binder.

Any suitable electrolyte for lithium ion batteries can be used. In one embodiment the electrolyte can be a mixture of ethylene carbonate and ethyl methyl carbonate (EMC/Dimethyl carbonate (DMC) (3:7 wt %) in LiPF$_6$ (1M) and can include high voltage electrolyte additive such as 1% HFiP (Tris(hexafluoro isopropyl)phosphate. Other electrolyte salts that can be used include LiClO$_4$, lithium bis(trifluoromethanesulfonyl)imide (LiTFSI), lithium bis(oxatlato)borate (LiBOB), dissolved in mixtures of organic solvents, including linear and cyclic carbonates such a propylene carbonate, dimethyl carbonate, and others. Other electrolyte compositions or additives can include fluorinated compounds as high voltage electrolyte compositions such as fluorinated ethylene carbonate (EC), fluorinated ether-EC, fluorinated linear carbonates, fluorinated ether, fluorinated linear sulfone, fluorinated sulfone, tetramethyl sulfone (TMS), and sulfone-silane hybrid electrolytes.

A method of making a positive electrode according to the invention includes the steps of providing (i) carbon fibers; (ii) a lithium rich composition; (iii) a binder composition with conductive carbon; (iv) a solvent; creating a homogenous slurry of at least the lithium rich composition and the binder composition; coating the slurry onto a surface; and thermally treating the slurry to form a composite electrode. In one aspect the binder composition comprises a polymer binder and conductive carbon particles, and the carbon fiber is carbon nanofiber. This slurry can be coated onto a metal current collector such as aluminum. In another aspect, the binder composition comprises mesophase pitch and the carbon fibers are provided as a mat, and a slurry of the pitch and lithium rich composition is coated onto the mat.

The lithium rich composition can be 85-90%, the binder composition comprises mesophase pitch 5-7%, and the carbon fibers are nanofibers 0.5-1%, by total weight of the positive electrode.

The solvent can be any suitable solvent. The solvent can be an organic solvent. The solvent can be N-vinyl pyrolidonne.

The invention can utilize commercially prepared loose carbon fiber mat carbon fiber mat for supporting the active material. These mats are made from graphitic as well as nongraphitic carbon. One of the fibers that is used in this invention is derived from PAN (polyacrylonitirile) based precursor.

The slurry can be poured onto the carbon fiber mat and then thermally treated to carbonize the mesophase pitch binder. This will bind the carbon fibers and lithium rich composition together, and will adhere these materials to the carbon fiber mat to form the positive electrode. Any suitable carbonization process can be utilized. In one embodiment, the carbonization step is a thermal treatment at between 500-700° C.

A method of making a negative electrode includes the steps of providing (i) carbon fibers; (ii) silicon nanoparticles; (iii) a mesophase petroleum pitch; (iv) a suitable solvent; creating a homogenous slurry of the constituents (i)-(iv); coating the slurry onto the surface of a carbon fiber matrix; and thermally treating the slurry to carbonize the pitch and form a composite electrode. Carbonizing the mesophase pitch will bind the silicon particles to the carbon fibers, and will adhere the anode materials to the anode carbon fiber mat.

EXAMPLES

Preparation of Silicon-Carbon Fiber Electrodes

Poly acrylonitrile based non graphitic carbon fibers are used as current collector for preparation of silicon anodes. The surface area of fibers is 0.7 m$^2$/g, as measured by $N_2$ adsorption. As received, the carbon fibers were in the form of fiber mat. The fiber substrate was coated by spreading with slurry of P—pitch (50 weight %, from Cytec Industries Inc., USA) and Silicon nano powder (Size ~100 nm, 50 weight %, from Aldrich) in N-vinylpyrrolidone (NVP). The slurry of P—pitch and Silicon in NVP was prepared by thorough mixing of the material by high-energy ball milling (model 8000M Mixer/Mill) and mixing (SPEX SamplePrep, Metuchen, N.J., USA). During processing development, the pitch-to-Si powder ratio was kept constant (1 to 1). After coating, any excess slurry was carefully removed from the surface and the sheet was dried at 90° C. Typical loading of Silicon powder to CF mat achieved with this technique is approximately 40-50% by weight and is limited by the viscosity of the slurry. The sheets were then pressed at 1 Ton/cm$^2$. The pressed mats were then punched into desired coin cell size of area ~1 cm$^2$ followed by heating at 700° C.-100° C. under Ar atmosphere for 5 h to carbonize the petroleum pitch.

Preparation of Li-Rich NMC Electrodes

A typical process for high voltage cathode fabrication is given below Li-rich NMC composite electrodes were prepared with an N-methylpyrrolidone (NMP) (Aldrich, 99.5% purity) slurry of Li-rich NMC, PVDF (Aldrich), C-black (CB) (Super P), carbon nano fiber in wt. % ratio of 85:7.5:6:1.5 coated on to Al foil using doctor blade. The coated Al foil was the dried under vacuum at 90° C. for about 12 hrs followed by calendaring at pressure of 1 Ton/cm$^2$. The electrodes comprised ~10 mg of active Li-rich MNC per cm$^2$ on Al (Alfa Aesar, 99.99% purity) current collector.

FIG. 1 is a plot of voltage (V) vs. Li/Li$^+$ vs capacity (mAhg$^{-1}$) for a half cell. Both 1$^{st}$ cycle and C/10 curves are shown.

Figure 2:
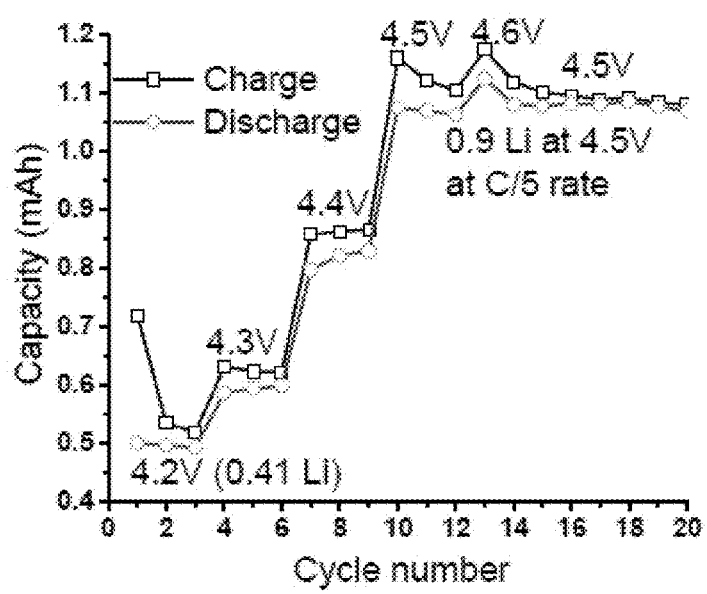
FIG. 2 is a plot of capacity (mAh) vs. cycle number for a full cell.

FIG. 2 is a plot of capacity (mAh) vs cycle number for a full cell. The cell is a two electrode coin-type cell configuration with EC-DMC 1:2/1.2 M LiPF$_6$ as the electrolyte. This plot shows increasing capacity at higher cycling voltage and upon prolonged cycling.

Figure 3:
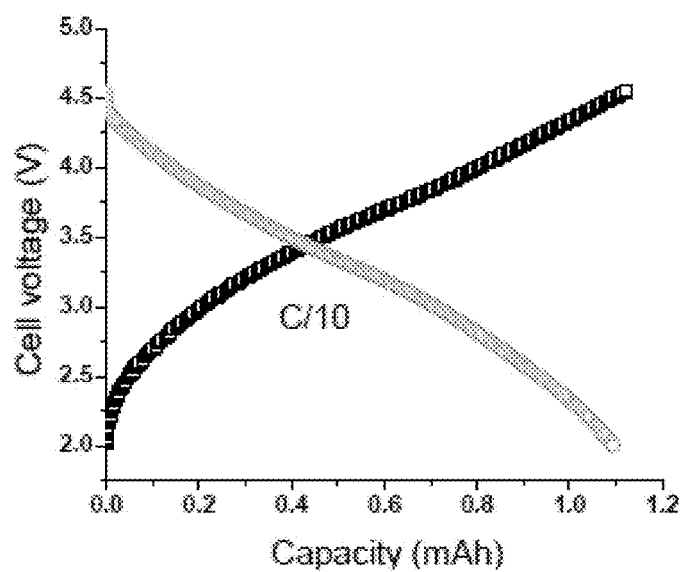
FIG. 3 is a plot of cell voltage vs. capacity (mAh).

FIG. 3 is a plot of cell voltage vs. capacity (mAh) for the full cell Lithium rich MNC and Si—C. This plot demonstrates a capacity between 2-4.6 volts.

Figure 4:
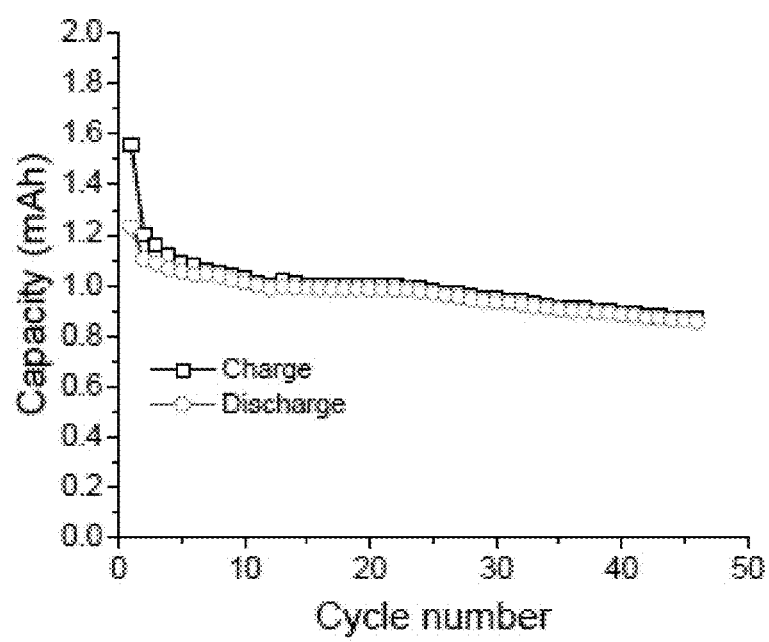
FIG. 4 is a plot of capacity (mAh) vs. cycle number.

FIG. 4 is a plot of capacity (mAh) vs. cycle number for Li-rich NMC-Si—C fiber full cell and demonstrates stable capacity both on charge and discharge with cycling up to almost 50 cycles.

Figure 5:
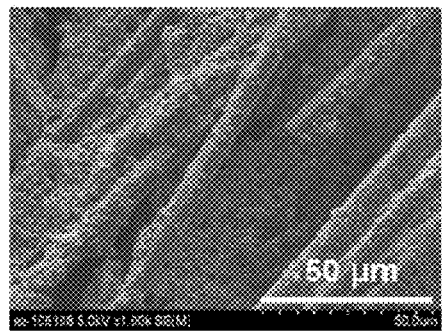
FIGS. 5(a)-(c) are scanning electron microscopy images of a silicon-carbon fiber composite and varying magnifications.
Figure 5:
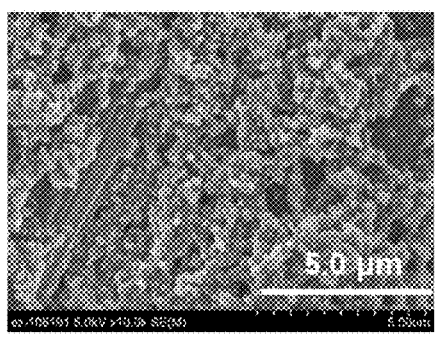
Figure 5:
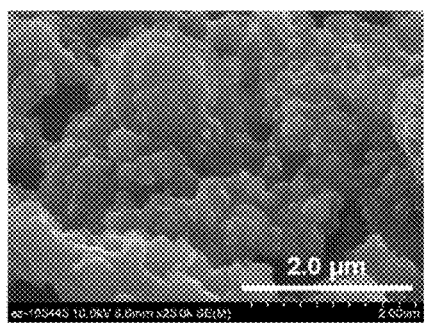

FIGS. 5(a)-(c) is a scanning electron microscopy images of a silicon-carbon fiber composite and varying magnifications. The figures demonstrate good porosity for electrolyte and ion transport.

Figure 6:
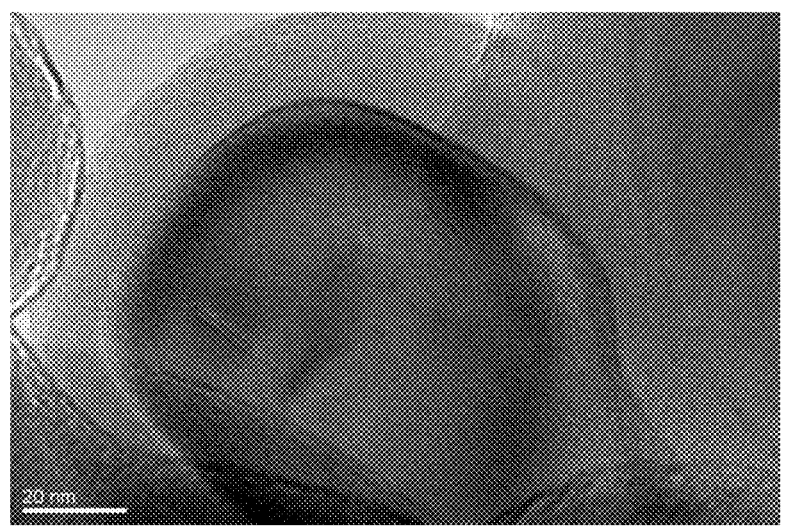
FIG. 6 is a scanning electron microscopy image of a silicon-nanoparticle and carbon binder.

FIG. 6 is a scanning electron microscopy image of a silicon-nanoparticle and carbon binder. This image demonstrates how the pitch-based carbon binder coats the silicon nanoparticles to adhere them to the carbon fibers.

Figure 7:
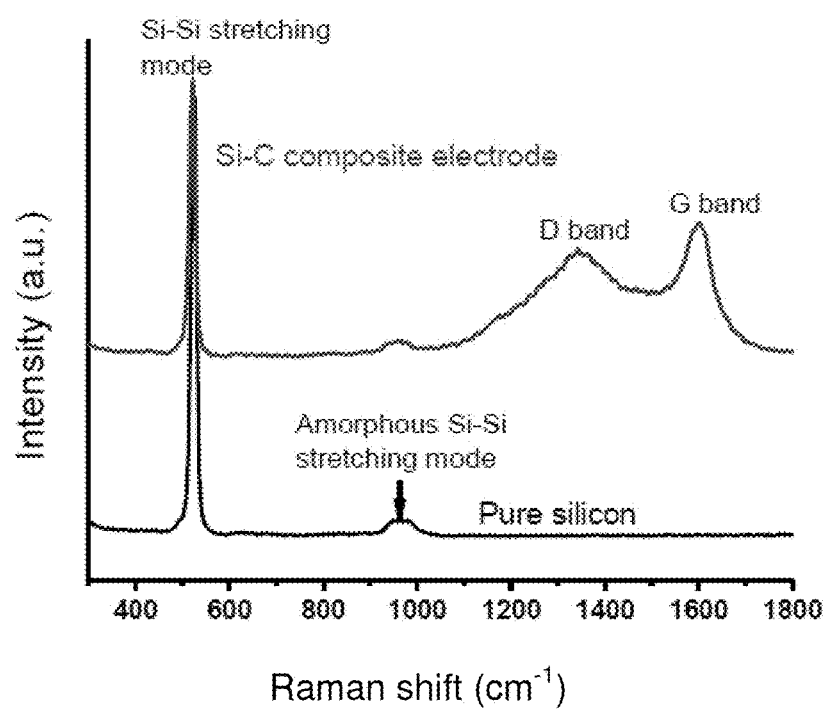
FIG. 7 is a plot of intensity (a.u.) vs. Raman shift (cm$^{-1}$).

FIG. 7 is a plot of intensity (a.u.) vs Raman shift (cm$^{-1}$). The presence of the D band (1350 cm-1) and G (1590 cm-1) band indicate the presence of amorphous carbon and fiber and Si at 520 cm$^{-1}$.

Figure 8:
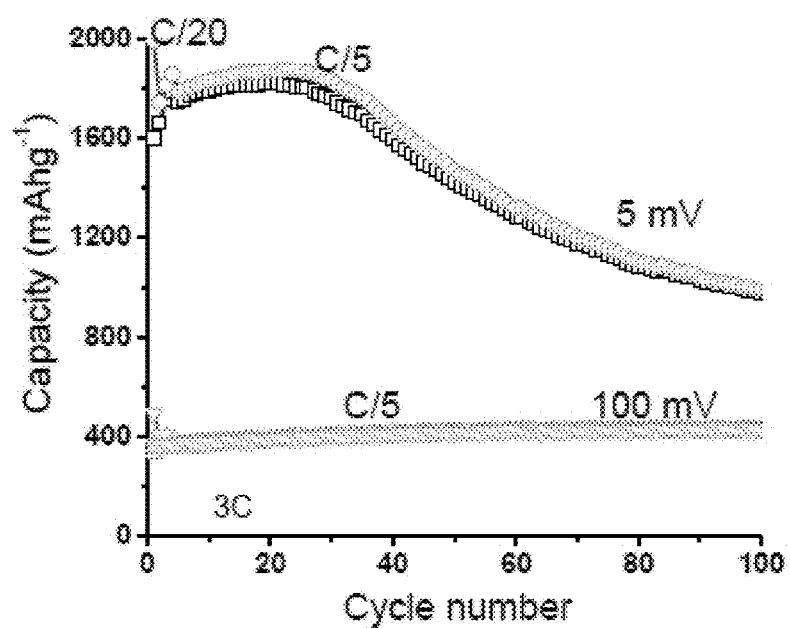
FIG. 8 is a plot of capacity (mAhg$^{-1}$) vs. cycle number for Si—C anode.

FIG. 8 is a plot of capacity (mAhg$^{-1}$) vs. cycle number for silicon-carbon fiber electrodes. The data shows high capacity for Si—C anode when cycled to 5 mV (measured in a half cell configuration with Li metal as counter-electrode), When cycled up to only 100 mV the capacity is around 400 mAh/g but very stable cycle life.

Figure 9:
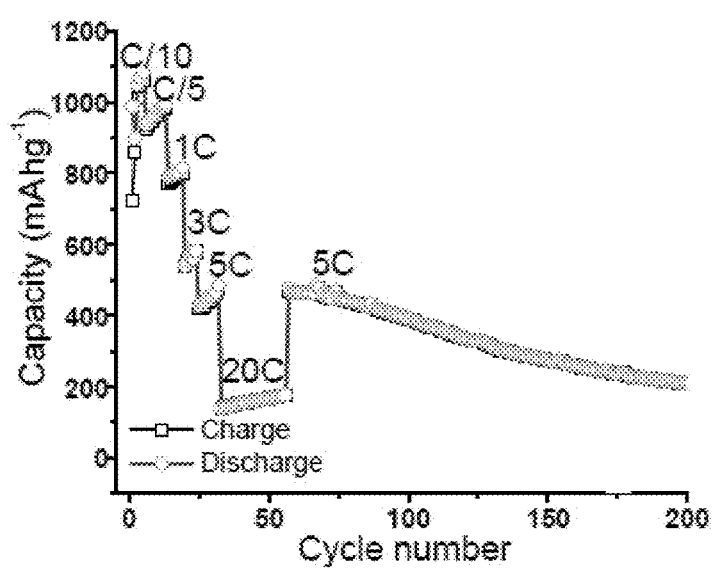
FIG. 9 is a plot of capacity (mAhg$^{-1}$) vs. cycle number.

FIG. 9 is a plot of capacity (mAhg$^{-1}$) vs. cycle number at a number of different charge and discharge rate for the full Si—C—Li rich NMC cell.

Figure 10:
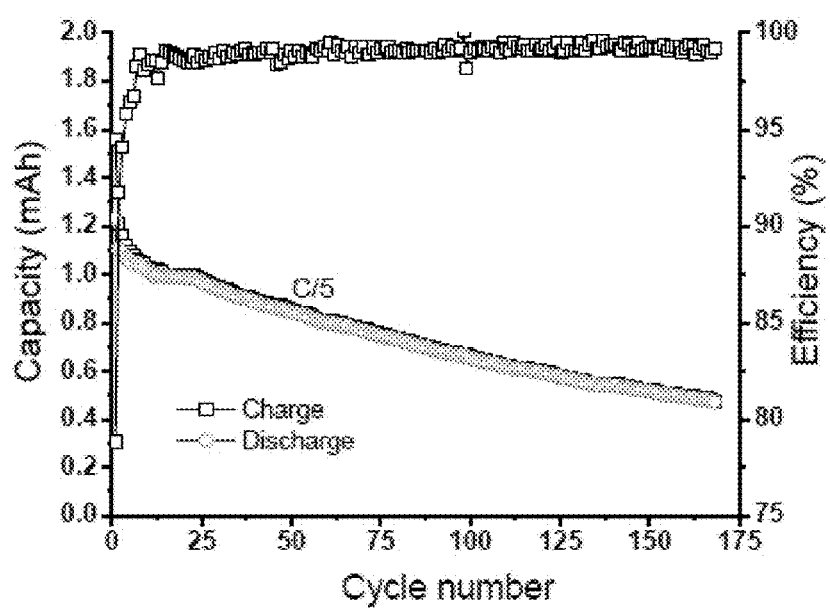
FIG. 10 is a plot of capacity (mAhg$^{-1}$) vs. cycle number, and coulombic efficiency vs. cycle number.

FIG. 10 is a plot of capacity (mAhg$^{-1}$) vs. cycle number and coulombic efficiency vs. cycle number. The coulombic efficiency plot at the top of the chart indicates good lithium intake.

This invention can be embodied in other forms without departing from the spirit or essential attributes thereof, and accordingly reference should be had to the following claims as indicating the scope of the invention.

We claim:

1. A lithium ion battery, comprising:
a positive electrode comprising an integrated conductive non-graphitic carbon fiber mat current collector and a positive electrode composition, the positive electrode composition comprising a binder composition and a lithium rich composition, the binder composition comprising a mixture of carbonized pitch and conductive carbon nanofibers, and the lithium rich composition comprising at least one selected from the group consisting of $Li_{1+x}(M_y, M_z^{II} M_w^{III})O_2$ where x+y+z+w=1, $xLi_2MnO_3(1-x)LiMO_2$, where x=0.2-0.7, wherein M, $M^{II}$ and $M^{III}$ are interchangeably manganese, nickel and cobalt, and $LiM^*_{2-x}M^*_x{}^{II}O_4$, wherein $M^*$ and $M^{*II}$ are manganese and nickel, respectively, with x=0.5, the positive electrode comprising 85-90 wt. % lithium rich composition, 5-7 wt. % carbonized pitch, and 0.5-1 wt. % carbon nanofibers by total weight of the positive electrode, the conductive non-graphitic carbon fiber mat serving as a support for the positive electrode composition and as a current collector for the positive electrode, the thickness of the positive electrode being between 75-150 µm;

a negative electrode comprising an integrated conductive non-graphitic carbon fiber mat current collector having bound thereto silicon nanoparticles, and a binder composition comprising a mixture of carbonized pitch surrounding the silicon nanoparticles and between the silicon nanoparticles and the carbon fiber mat, the conductive non-graphitic carbon fiber mat serving as a support for the silicon nanoparticles and as a current collector for the negative electrode, the thickness of the anode being greater than 100 µm;

the carbon fibers of the conductive non-graphitic carbon fiber mats having a diameter between 2-25 µm, and the carbon nanofibers having a diameter between 100-200 nm, and the void space in the electrodes being 50% to 70%; and an electrolyte interposed between the positive electrode and the negative electrode, wherein the battery has a nominal voltage greater than 3.75 volts, can be cycled to a voltage greater than 4.6 volts, and wherein the total gravimetric energy density of the battery exceeds 400 Wh/Kg.

2. The battery of claim 1, wherein the binder composition of the positive electrode, the negative electrode, or both the positive and the negative electrode, comprises a mesophase pitch derived conductive carbon binder.

3. The battery of claim 1, wherein the silicon nanoparticles are between 50-100 nm in diameter.

4. The battery of claim 1, the total volumetric energy density of the battery exceeds 600 Wh/L.

5. The battery of claim 1, wherein the loading of silicon nanoparticles on the carbon fibers of the carbon fiber mat of the negative electrode is between 30 and 50% of the total electrode mass per unit area.

6. The battery of claim 1, wherein the silicon loading of the negative electrode is between 30-50% of the total electrode mass per unit area.

7. The battery of claim 1, wherein the negative electrode has an initial capacity that exceeds at least by 10% the capacity of the positive electrode when normalized to thickness and area of the electrode.

8. The battery of claim 1, wherein the electrodes do not comprise a polymeric binder.

9. The battery of claim 1, wherein one of the lithium rich composition is $Li_{1.2}Mn_{0.525}Ni_{0.175}Co_{0.1}O_2$.

10. The battery of claim 1, wherein the lithium rich composition is $LiMn_{1.5}Ni_{0.5}O_4$.

11. The battery of claim 1, wherein the lithium rich composition is provided as particles with particle sizes below 100 nm.

12. The battery of claim 1, wherein the carbon nanofibers of the positive electrode have an outer diameter of between 100 and 200 nm.

13. The battery of claim 1, wherein the carbon nanofibers of the positive electrode have a hollow core of from ½ to ⅔ of the total fiber diameter.

* * * * *